US012607026B2

(12) United States Patent　　　(10) Patent No.: US 12,607,026 B2

Khoshnevis　　　　　　　　　　　　(45) Date of Patent: Apr. 21, 2026

(54) SYSTEM AND METHODS FOR CONSTRUCTION 3D PRINTING

(71) Applicant: CONTOUR CRAFTING CORPORATION, Marina Del Rey, CA (US)

(72) Inventor: Behrokh Khoshnevis, Marina Del Rey, CA (US)

(73) Assignee: Contour Crafting Corporation, Marina del Rey, CA (US)

( * ) Notice: Subject to any disclaimer, the term of this patent is extended or adjusted under 35 U.S.C. 154(b) by 145 days.

(21) Appl. No.: 18/491,726

(22) Filed: Oct. 20, 2023

(65) Prior Publication Data

US 2024/0133192 A1　　Apr. 25, 2024
US 2024/0229481 A9　　Jul. 11, 2024

Related U.S. Application Data

(60) Provisional application No. 63/417,949, filed on Oct. 20, 2022.

(51) Int. Cl.
*E04G 21/04*　　　(2006.01)
*B33Y 30/00*　　　(2015.01)
*E04B 1/35*　　　(2006.01)

(52) U.S. Cl.
CPC ........ *E04G 21/0463* (2013.01); *E04B 1/3505* (2013.01); *B33Y 30/00* (2014.12)

(58) Field of Classification Search
CPC ............... E04B 1/3505; E04G 21/0463; E04G 2021/049; B33Y 30/00; B33Y 10/00
See application file for complete search history.

(56) References Cited

U.S. PATENT DOCUMENTS

| | | | |
|---|---|---|---|
| 9,902,145 B2 * | 2/2018 | Chang .................... | B33Y 30/00 |
| 10,052,860 B2 * | 8/2018 | Chang ................... | B29C 64/106 |
| 10,066,413 B2 * | 9/2018 | Khoshnevis .......... | E04H 12/341 |
| 10,695,973 B2 * | 6/2020 | Boyd, IV .............. | B29C 64/209 |
| 10,907,375 B2 * | 2/2021 | Khoshnevis .......... | E04H 12/341 |
| 2013/0295338 A1 * | 11/2013 | Keating ................. | E04B 1/167 |
| | | | 425/375 |

(Continued)

FOREIGN PATENT DOCUMENTS

WO　　WO-2020204966 A1 * 10/2020　　......... E04G 21/0463

*Primary Examiner* — Seyed Masoud Malekzadeh

(74) *Attorney, Agent, or Firm* — Risley IP; David R. Risley

(57) ABSTRACT

In one embodiment, a construction three-dimensional (3D) printing system includes a construction three-dimensional printer having a tower, an articulable arm that extends from the tower, the arm including a proximal arm segment that is mounted to the tower at its proximal end and a distal arm segment whose proximal end is pivotally mounted to a distal end of the proximal arm segment, wherein the arm is configured to linearly travel up and down along the tower and wherein the distal arm segment is configured to be pivoted relative to the proximal arm segment, a nozzle assembly mounted to a distal end of the distal arm segment of the articulable arm, the nozzle assembly being configured to receive printing material and extrude it to fabricate three-dimensional structures, and a rover upon which the tower is mounted, the rover being configured to move the construction three-dimensional printer around a construction site.

20 Claims, 16 Drawing Sheets

(56) References Cited

U.S. PATENT DOCUMENTS

| | | | |
|---|---|---|---|
| 2015/0300036 A1* | 10/2015 | Khoshnevis | E04G 21/0463<br>425/63 |
| 2016/0001461 A1* | 1/2016 | Gardiner | E04G 11/00<br>264/219 |
| 2016/0107390 A1* | 4/2016 | Davis | B33Y 30/00<br>700/119 |
| 2016/0263822 A1* | 9/2016 | Boyd, IV | B32B 27/00 |
| 2016/0297151 A1* | 10/2016 | Chang | B33Y 30/00 |
| 2017/0106592 A1* | 4/2017 | Keating | E04G 21/185 |
| 2018/0022026 A1* | 1/2018 | Compton | B29C 64/188<br>264/54 |
| 2018/0207870 A1* | 7/2018 | Tyler | B22F 10/12 |
| 2018/0345533 A1* | 12/2018 | Hernandez | E04B 1/3505 |
| 2018/0371785 A1* | 12/2018 | Khoshnevis | E04H 12/341 |
| 2019/0217527 A1* | 7/2019 | Boyd, IV | B32B 3/12 |
| 2019/0262986 A1* | 8/2019 | Newell | B33Y 50/02 |
| 2020/0061866 A1* | 2/2020 | Giles | B28B 3/2645 |
| 2020/0094280 A1* | 3/2020 | Holloway | B25J 5/00 |
| 2020/0238619 A1* | 7/2020 | Brodie | B33Y 70/10 |
| 2020/0308854 A1* | 10/2020 | Schubart | E04G 21/16 |
| 2021/0187855 A1* | 6/2021 | Cardon | B29C 64/209 |
| 2021/0404195 A1* | 12/2021 | Huth | E04G 21/0463 |
| 2022/0080657 A1* | 3/2022 | Budge | B29C 64/343 |
| 2022/0298812 A1* | 9/2022 | Compton | B33Y 30/00 |
| 2023/0078334 A1* | 3/2023 | Charmley | B28B 23/0062<br>425/63 |
| 2023/0151623 A1* | 5/2023 | Khoshnevis | B25J 9/026<br>414/10 |
| 2024/0035293 A1* | 2/2024 | Compton | B33Y 30/00 |

* cited by examiner

FIG. 11

SYSTEM AND METHODS FOR CONSTRUCTION 3D PRINTING

CROSS-REFERENCE TO RELATED APPLICATION

This application claims priority to co-pending U.S. Provisional Application Ser. No. 63/417,949, filed Oct. 20, 2022, which is hereby incorporated by reference herein in its entirety.

BACKGROUND

Construction three-dimensional (3D) printing is a relatively new construction technique that utilizes 3D printing as a core technology to fabricate buildings or construction components. In construction 3D printing, a construction printing material, such as mortar or concrete, is extruded from a nozzle and walls or other structures are built up layer upon layer, just as with small-scale 3D printing. In some cases, the structures are fabricated on-site, removing the need to transport the fabricated structure to a desired location.

A number of different approaches have been demonstrated to date, which include on-site and off-site fabrication of buildings and construction components, using industrial robots, gantry systems, and tethered autonomous vehicles. Demonstrations of construction 3D printing technologies have included fabrication of housing, construction components (cladding and structural panels and columns), bridges and civil infrastructure, artificial reefs, follies, and sculptures.

Today, construction 3D printing is often performed using robotic systems using a combination of linear and rotational axes. For example, such a system may comprise a gantry from which extends an articulatable arm that supports an extrusion nozzle at its distal end. During the printing process, the construction printing material typically is delivered to the nozzle using a material line, such as a hose.

While existing robotic systems can be effectively used to fabricate large-scale structures, those systems comprise a variety of drawbacks that, if overcome, would enable such structures to be fabricated more quickly, with greater ease, and at lower cost, which would facilitate wider adoption of 3D printing in construction.

BRIEF DESCRIPTION OF THE DRAWINGS

The present disclosure may be better understood with reference to the following figures. Matching reference numerals designate corresponding parts throughout the figures, which are not necessarily drawn to scale.

FIG. 11 is a side perspective view illustrating a further embodiment of a nozzle assembly that can be used with a construction 3D printer, the assembly shown in the process of simultaneously extruding parallel spaced layers of printing material to form spaced parallel walls having a gap between them and further embedding staples that extend into and between the walls to maintain constant spacing between them.

DETAILED DESCRIPTION

As described above, while existing robotic three-dimensional (3D) construction printing systems can be effective in constructing large-scale structures such as buildings, such systems comprise a variety of drawbacks that, if overcome, would facilitate wider adoption of 3D printing in construction. Disclosed herein are example robotic construction 3D printing systems and methods that are not burdened by such drawbacks.

In one embodiment, a construction 3D printing system includes a printer that can be automatically folded (retracted) and extended so that the printer can be, in essence, collapsed so that it can fit within a relatively small space, such as that within a freight container, to facilitate storage and transport of the system. In another embodiment, a construction 3D printing system is integrated with a rover that facilitates movement and positioning of the construction 3D printer, which can be performed manually using a remote control device or autonomously by a computer program. In another embodiment, a construction 3D printing system incorporates a leveling module that positions a tower of the printer in a vertical orientation without the need for outriggers, which are commonly required to orient and stabilize some existing construction 3D printers and other construction equipment. In another embodiment, a construction 3D printing system includes an extrusion nozzle rotation mechanism that incorporates a quick-release feature that enables the nozzle assembly to be quickly and easily attached and detached from the remainder of the printer. In another embodiment, a construction 3D printing system utilizes an aerial tram system to deliver printing material to the extrusion nozzle of the system. Such a system can replace the hoses that are used for material delivery in existing construction 3D printing systems. By using a tram system, more desirable construction materials, such as conventional concrete that, unlike the mortar typically used in construction 3D printing, normally contains large gravel and a high sand content. In another embodiment, a construction 3D printing system is configured to extrude parallel layers of printing material so that hollow-core walls can be constructed. In such embodiments, the spacing between the parallel layers can be maintained using a mechanism that automatically applies stabilizing elements, such as staples, rods, or flat strips of solid material, that extend between and over the top layers of a printed structure at regularly spaced intervals.

In the following disclosure, various specific embodiments are described. It is to be understood that those embodiments are example implementations of the disclosed inventions and that alternative embodiments are possible. Such alternative embodiments include hybrid embodiments that include features from different disclosed embodiments. All such embodiments are intended to fall within the scope of this disclosure.

Figure 1:
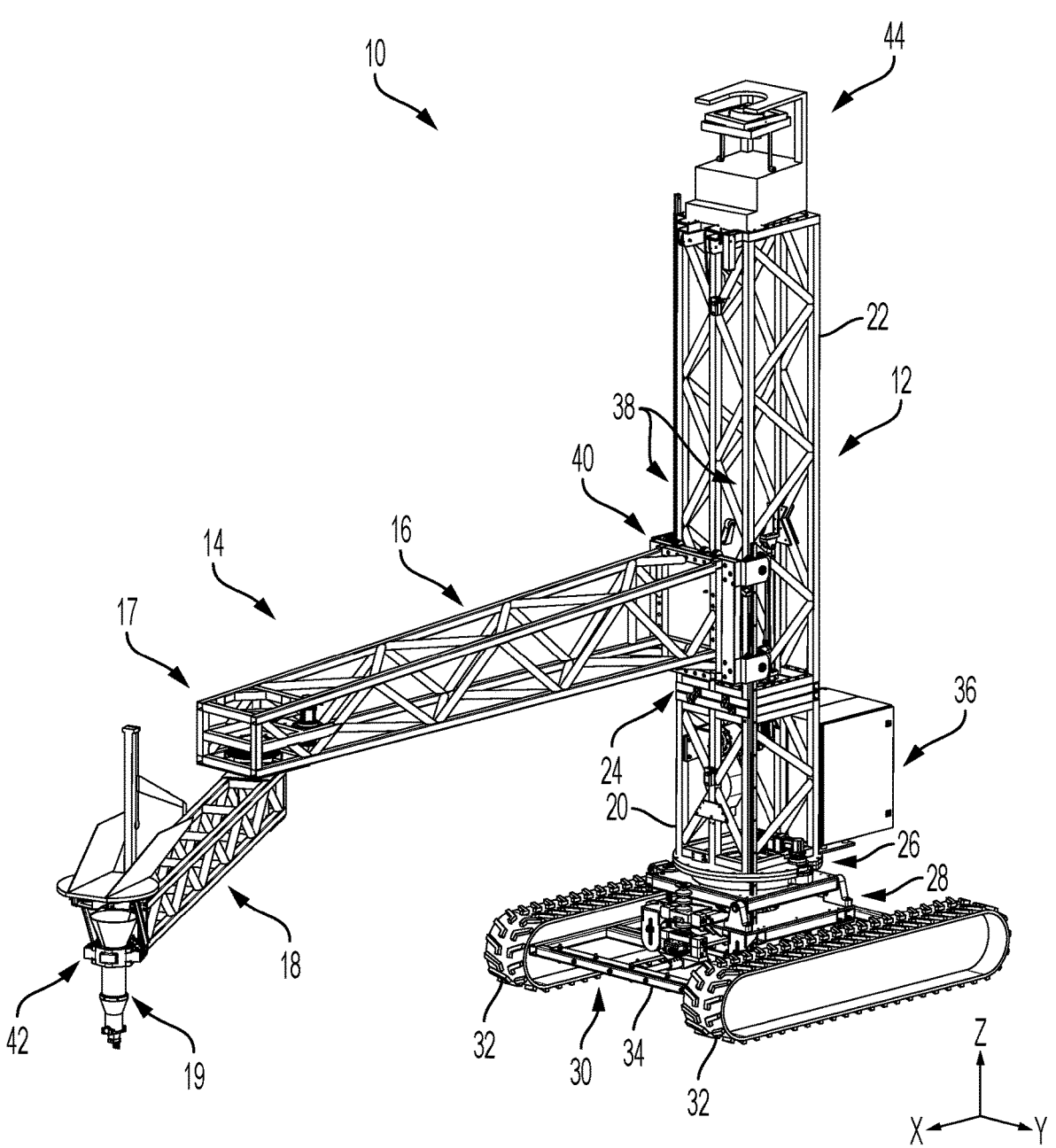
FIG. 1 is a front perspective view of an embodiment of a construction 3D printer that forms part of a construction 3D printing system.

FIG. 1 illustrates an example embodiment of a construction 3D printer 10 that can form at least part of a construction 3D printing system. As shown in the figure, the printer 10 generally comprises a vertical tower 12 from which extends an articulable arm 14, which includes a proximal arm segment 16 that is connected to the tower at its proximal end, and a distal arm segment 18 that is pivotally connected to the distal end of the proximal arm segment at an elbow joint 17. In the example of FIG. 1, each of the tower 12, proximal arm segment 14, and distal arm segment 18 are formed as elongated members having rectangular cross-sections defined by generally parallel, elongated beams that are secured together by angled cross beams. Irrespective of the construction of the tower 12 and arm 14, mounted to the distal end of the distal arm segment 18 is a nozzle assembly 19 from which printing material can be extruded to fabricate a structure.

Figure 2:
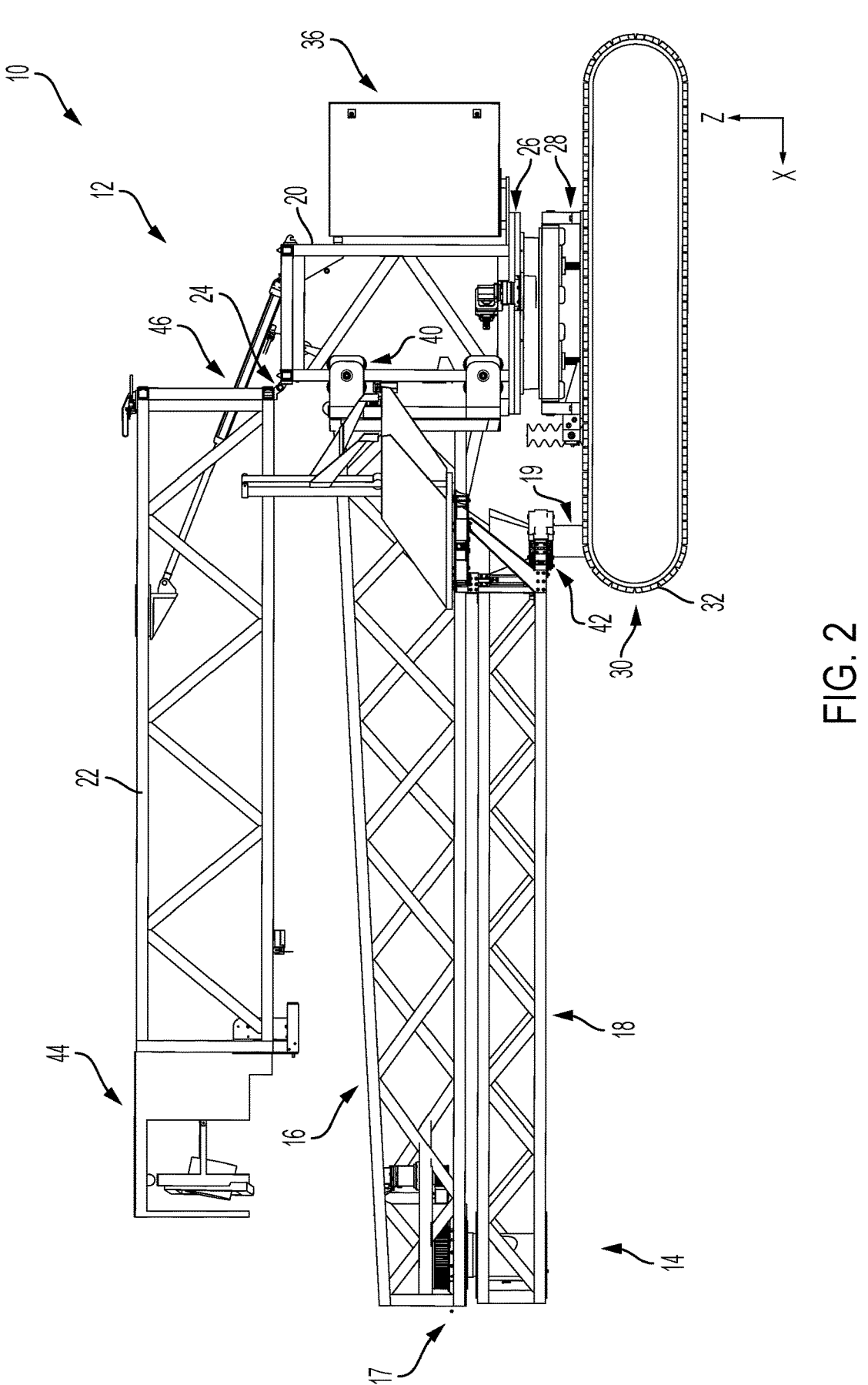
FIG. 2 is side view of the construction 3D printer of FIG. 1, illustrating the printer in a folded orientation that facilitates storage and transport of the printer and the printing system as a whole.

As is most readily apparent from FIG. 2, the tower 12 comprises a lower section 20 and an upper section 22. The upper section 22 is supported by and pivotally connected to the lower section 20. In particular, the upper section 22 of the tower 12 can pivot from the vertical orientation shown in FIG. 1 through 90 degrees to the horizontal orientation shown in FIG. 2, and vice versa, due to the provision of hinges 24, which are visible in both figures. The purpose for such pivoting and the manner in which it is achieved are described later with particular reference to FIG. 2.

With continued reference to FIGS. 1 and 2, the tower 12 and, more particularly the lower section 20 of the tower, is supported by and mounted to an index drive mechanism 26 that is configured to rotate the tower about its central longitudinal axis, which, in the orientation of FIG. 1, is aligned with the vertical Z axis or direction of the coordinate system identified in the figure. As is known in the art, the index drive mechanism 26 includes a motor, such as a servomotor, and other components, such as one or more gears, that facilitate that rotation, which enables the articulable arm 14 to be rotated as needed to extrude printing material in a desired location.

Figure 3:
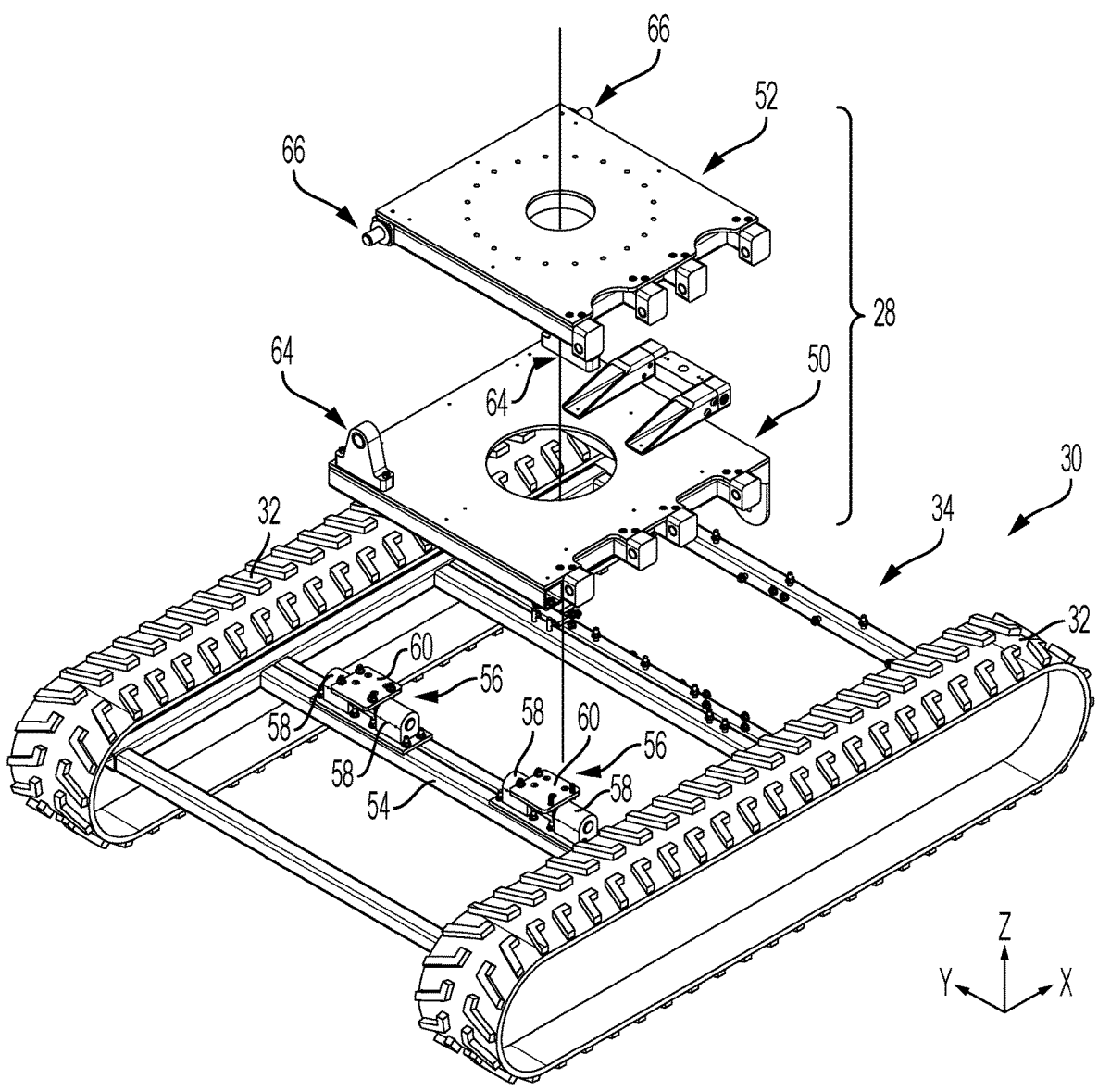
FIG. 3 is rear perspective view of part of a rover of the construction 3D printer of FIG. 1 and a leveling module that mounts to the rover, the leveling module shown in an exploded view.

As shown in both FIGS. 1 and 2, the index drive mechanism 26 is supported by and mounted to a leveling module 28 that, as is described in detail in relation to FIGS. 3-5 below, is configured to align the tower 12 with the vertical Z axis even if the printer 10 is positioned on an uneven surface, such as uneven ground. The leveling module 28 is, in turn, supported by and mounted to a rover 30 that is configured to move the printer 10 to a desired location, such as to a particular construction site or to a particular location within a construction site. In the example embodiment shown in FIGS. 1-4, the rover 30 includes two continuous rotatable tracks 32, one located on each lateral side of the printer 10, that are mounted on drive wheels (not shown) supported by and mounted to a rover chassis 34. As is apparent from FIGS. 3-5 described below, the leveling module 28 is directly mounted to that chassis 34. Also shown in FIGS. 1 and 2, is a housing 36 mounted to the rear of the lower section 20 of the tower 12 that contains various electronics that are used to supply power and send control commands to various electrical components of the printer 10, such as motors, winches, pistons, and the like.

While the tower 12 is configured to rotate about its central longitudinal axis, the articulable arm 14, and particularly the proximal arm segment 16, is configured to linearly travel up and down the tower when it is in its vertical, extended orientation shown in FIG. 1. More specifically, the arm 14 can be raised upward along (i.e., ascend) the tower 12 or be permitted to descend downward along the tower. Although such linear displacement can be achieved in a variety of ways, in the example of FIG. 1, the proximal arm segment 16 travels along linear rails 38 that are mounted to the front side of the tower 12. In some embodiments, the proximal arm segment 16 is fixedly mounted to vertically oriented trolly 40 at its proximal end that comprises wheels or bearings that can roll or slide along the tower rails 38. Such motion can be effected using, for example, a winch and pulley system in which a cable that is fixedly attached to the trolley 40 and wrapped around a pulley mounted near the top of the tower 12 can be wound up by the winch to raise the arm 14 or unwound by the winch to lower the arm.

As it is attached to the proximal arm segment 16, the distal arm segment 18 ascends and descends along with the proximal arm segment. In addition, as the proximal end of the distal arm segment 18 is pivotally mounted to the distal end of the proximal arm segment 16, the distal arm segment can rotate relative to the proximal arm segment about a vertical axis located at the elbow joint 17. Such rotation can be effected by, for example, a servomotor located at or near the joint 17. Accordingly, the nozzle assembly 19 mounted to the distal end of the distal arm segment 18 can be positioned in a desired location using one or more of operation of the rover 30, vertical rotation of the tower 12, vertical displacement of the articulable arm 14, and rotation of the distal arm segment 18 relative to the proximal arm segment 16.

With particular regard the rover 30, the rover can be remotely controlled by an operator or configured to operate autonomously. In the latter case, the printer 10 can comprise additional components that enable autonomous operation, such as various sensors (e.g., accelerometers, gyroscopes, a GPS module, etc.), which collect and provide measured data to a computing device that executes software programed to determine how to drive the rover 30 based at least in part on the received data. Irrespective of whether the rover 30 is controlled by an operator or operates autonomously, the rover can be used to move the printer 10 to a target site, construct a structure there, move onto a further target site, and so forth, potentially significantly reducing the time normally needed to set up the printer in preparation for such construction. In addition, when the rover 30 is operated remotely or autonomously, it can be used to fabricate structures in hazardous locations, such as radioactive areas or conflict zones.

In addition to the above-described motions of which the printer 10 is capable, the nozzle assembly 19 can be rotated about its vertical, central, longitudinal axis located at the distal end of the distal arm segment 18. Such rotation can be performed by a nozzle rotation mechanism, such as the mechanism 42 illustrated in FIGS. 6 and 7, which are described below.

With further reference to FIG. 1, also illustrated is a material transfer station 44 that is mounted to the top of the tower 12. As is described relation to FIG. 9, the material transfer station 44 comprises part of an aerial tram system illustrated in FIG. 8, which is configured to continually deliver printing material to the nozzle assembly 19. As explained below, the material transfer station 44 can be located at a midpoint of the aerial tram system at which printing material collected by a first tram can be transferred to a second tram, which then delivers the printing material to the nozzle assembly 19. With such a material delivery scheme, it is not necessary to drive the printing material through a hose to deliver it to the nozzle assembly 19, which enables the extrusion of printing materials having large gravel and/or high sand content, such as conventional concrete, instead of the mortar typically used in construction 3D printing, which is less desirable from a construction standpoint.

As noted above, the upper section 22 of the tower 12 can pivot from the vertical orientation shown in FIG. 1 to the horizontal orientation shown in FIG. 2, and vice versa. This functionality enables the printer 10 to be folded (or retracted or collapsed) into a compact configuration that requires less space for storage or transport. FIG. 2 illustrates the folded orientation. As shown in that figure, the proximal arm segment 16 has been lowered so that it is positioned below the hinges 24 on the tower 12 and, therefore, below the upper section 22 of the tower. In addition, the distal arm segment 18 has been rotated inward such that it is below and aligned and parallel with the proximal arm segment 16. Furthermore, the upper section 22 of the tower 12 has been pivoted forward and downward through 90 degrees so that it is above and aligned and parallel with the proximal arm segment 16. In some embodiments, such pivoting of the upper section 22 of the tower 12 can be achieved using a linear actuator 46 that is pivotally attached at a first end to the upper section and pivotally attached at a second end to the lower section 20 of the tower. When the printer 10 is placed in the folded, compact configuration shown in FIG. 2, it is small enough to fit within a conventional container, such as a 20-foot freight container. This, of course, makes it much easier store the printer 10 as well as to transport it to a construction site. In some embodiments, the printer 10 can be configured to automatically fold itself into the orientation shown in FIG. 2 as well as automatically unfold and extend itself into an operational orientation, such as that shown in FIG. 1.

In an ideal situation, the construction site at which the printer 10 is to be operated would be a perfectly horizontal surface. As this rarely is the case, however, measures must be taken to ensure that the printer tower 12 is vertical and aligned with the Z axis, otherwise the extrusion nozzle would not remain at a consistent distance from the surface upon which the printing material is to be extruded as the nozzle is moved. The typical solution to this problem, both for construction 3D printers and other construction equipment, such as cranes, is to extend four outriggers from the equipment that, when deployed, support the equipment above the ground surface in a level orientation. While the use of outriggers has been the norm for many years, it comes with attendant drawbacks. First, as the outriggers normally extend outward from the equipment, they significantly increase the footprint of the equipment and occupy space upon which it may be desired to fabricate a structure. This limits the type, number, or size of structures that can be built at the construction site and/or requires moving the printer to access the space occupied by the outriggers. Second, the feet of the outriggers are often small and, given the heavy weight of most construction equipment, one or more of the outriggers may sink into the ground or other work surface, especially as the components of the equipment, such as an articulable arm or boom is repositioned as the work is performed. Such a result can be especially detrimental in the case of construction 3D printing in which alignment of the various extruded layers is often critical.

The construction 3D printer 10 obviates the need for such outriggers and, therefore, avoids the problems associated with them through use of the aforementioned leveling module 28. FIG. 3 shows the rover 30 (various components, such as the drive mechanism, of the rover not shown for purposes of clarity) and the leveling module 28 in an exploded view. In the context of the figure, the rear of the rover 30 and leveling module 28 are in the foreground, the front of the printer 10 faces the positive X direction, the near track 32 is the right-side track, and the distant track 32 is the left-side track. As depicted in the figure, the leveling module 28 includes a lower platform 50 and an upper platform 52. The lower platform 50 pivotally mounts to the rover chassis 34. In the example embodiment of FIGS. 3-5, the lower platform 50 pivotally mounts to a crossbeam 54 of the chassis 34. Mounted on that crossbeam 54 are two hinges 56, each comprising two lateral hinge bearings 58 between which a shaft (not visible) extends. The shafts are free to pivot along their central longitudinal axes relative to the hinge bearings 58 and the mounting flanges 60 are fixedly mounted to the shafts and to the underside of the lower platform 50. With the hinges 56 oriented as shown in FIG. 3, the front side of the lower platform 50 can be pivoted upward and downward relative to the chassis 34.

Figure 4:
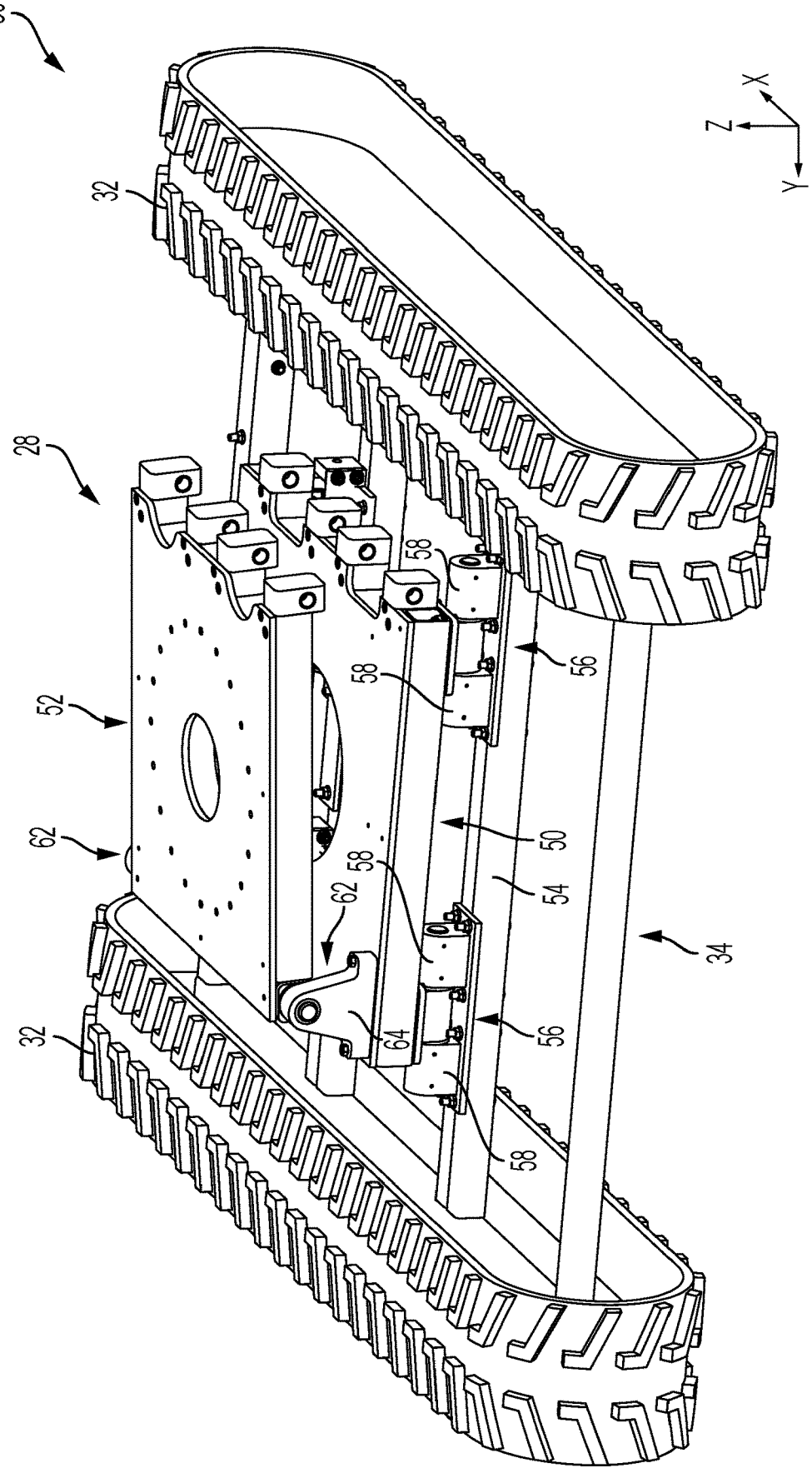
FIG. 4 is a further rear perspective view of the rover and the leveling module of FIG. 3 in which the leveling module is shown assembled and mounted to a chassis of the rover.

The upper platform 52 is pivotally mounted to the lower platform 50 with two further hinges 62, which are visible in FIG. 4. As shown in FIG. 4, two hinge bearings 64 are mounted to the top of the lower platform 50 and receive shafts 66 that extend outward from the upper platform 52 (FIG. 3), thereby forming the two hinges 62. With this configuration, the right side of the upper platform 52 can pivot upward and downward relative to the lower platform 50. FIG. 4 shows the upper platform 52 in an upwardly pivoted orientation such that its left side is closer to the lower platform 50 that its right side. Notably, the hinges 62 about which the upper platform 52 can pivot are orthogonal and adjacent to the hinges 56 about which the lower platform 50 can pivot. In the example of FIGS. 3-5, the lower platform hinges 56 are located at the rear side of the platform and the upper platform hinges 64 are located at the left side of the platform, adjacent to the lower platform hinges. The orthogonal and adjacent configuration enables, through independent pivoting of the platforms 50, 52, the printer tower 12 to be aligned with the vertical Z axis even when the rover 30 is on a non-horizontal surface.

Figure 5:
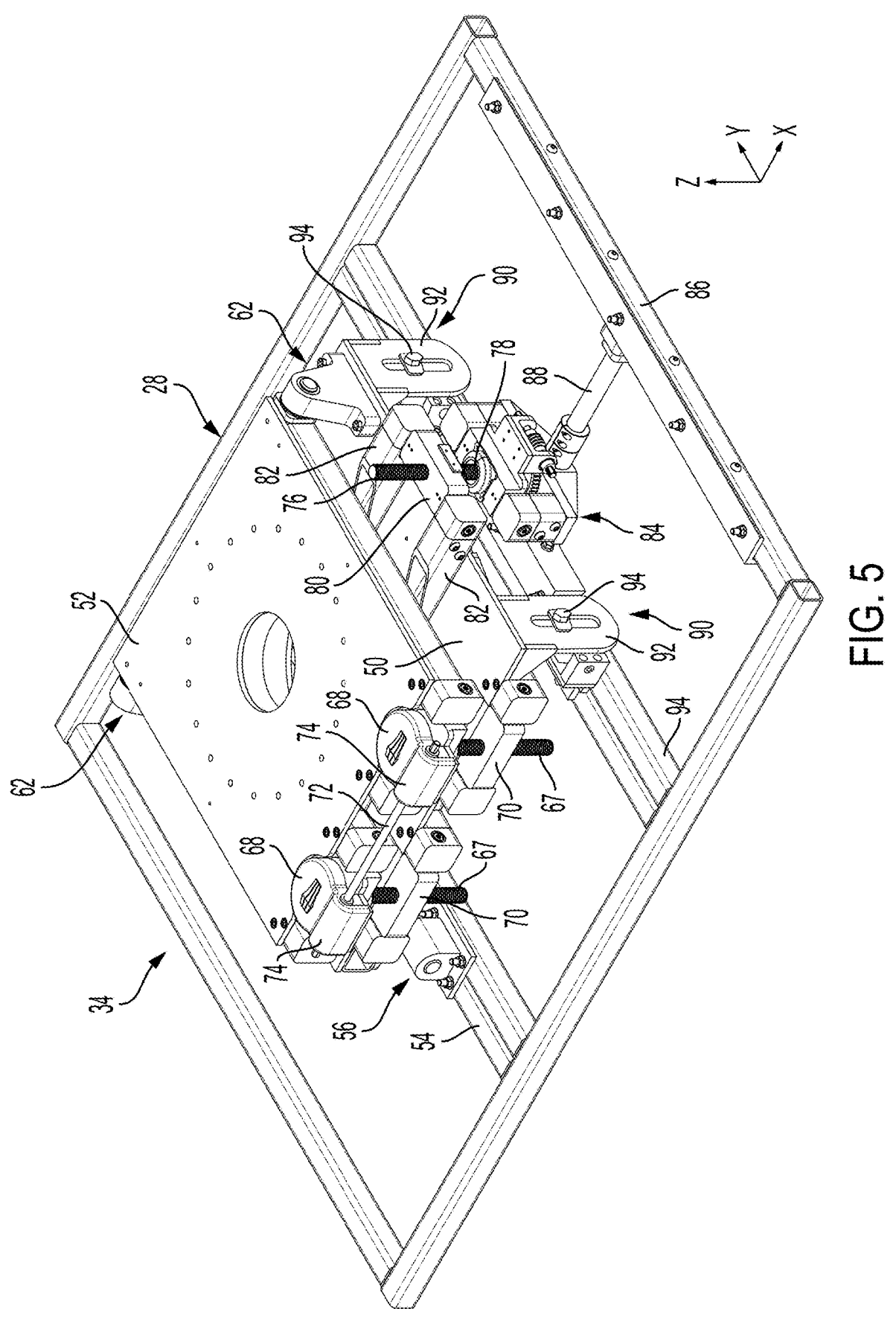
FIG. 5 is a front perspective view of the rover chassis and the leveling module shown in FIG. 4, and illustrates adjustment mechanisms of upper and lower platforms of the leveling module as well as locking brackets of the lower platform.

FIG. 5 illustrates the front of the rover chassis 34 and the leveling module 28 to show adjustment mechanisms of the leveling module 28 configured to independently pivot the platforms 50, 52. Beginning with the upper platform 52, provided on the opposite side of the platform from where the hinges 62 are located are two adjustment mechanisms that include vertically oriented screws 67 that each extends downward from a gear 68 threads into a block 70 that is pivotally mounted to the lower platform 50. The gears 68 can be simultaneously driven (rotated) with an adjustment shaft 72 that extends between two worm-gear drives 74, one associated with each gear. When the adjustment shaft 72 is rotated, either manually or with a motor, the screws 66 are simultaneously rotated about their central longitudinal axes to either pivot the platform 52 upward or downward, depending upon the direction the adjustment shaft is rotated. Accordingly, the upper platform 52 is supported at four points by the two hinges 62 and the two screws 66 of the adjustment mechanisms.

The lower platform 50 can be pivoted in a similar manner except that pivoting is achieved using an adjustment mechanism comprising a single vertical screw 76 that is positioned on the opposite side of the platform from where the hinges 56 are located. In this case, the screw 76 extends upward from a gear 78 and threads into a block 80 that is pivotally mounted to mounting brackets 82 fixedly attached to the top of the lower platform 50. The screw 76 and its gear 78 are mounted to a housing 84 that is connected to a further crossbeam 86 of the chassis 34 with a swivel shaft 88. In view of the above-described configuration, the lower platform 50, unlike the upper platform 52, is supported at only three points by the two hinges 56 and the screw 76, and the screw can pivot about the swivel shaft 88 to provide compliance between the leveling module 28 and the chassis that can account for twisting of the chassis that may result from the rover 30 being positioned on an uneven surface. In other words, the connection between leveling module 28 and the rover chassis 34 (via the lower platform 50) has a certain degree of flexibility that enables the chassis to conform to uneven surfaces while still enabling accurate vertical alignment of the printer tower 12.

As three-point support is not as strong as the four-point support that the upper platform 52 has, once appropriate leveling has been achieved by individually adjusting the upper and lower platforms, the lower platform 50 can be locked in place relative to the chassis 34 using one or more locking mechanisms, such as the locking brackets 90 shown in FIG. 5. As illustrated in that figure, one locking bracket 90 is provided on each side of the screw 76 and each comprises a plate 92 mounted to and extending downward from the lower platform 50 that is secured to a further crossbeam 94 of the chassis 34 using fasteners such as bolts 94 that pass through the brackets and thread into members mounted to the crossbeam.

In some embodiments, the printer tower 12 can be vertically aligned using the following procedure. First, the tower 12 is pivoted to its upright, vertical orientation if not already in that orientation and the articulable arm 14 is left in or moved to its lowest point along the tower. A level provided on either of the two edges of the upper platform 52 adjacent to the hinges 62 can then be monitored while pivoting the platform with the screws 66 of the upper platform adjustment mechanisms until the level indicates that the platform is horizontal. Next, a level placed along the edge of the lower platform 50 opposite to the edge at which the hinges 56 are positioned can be monitored while pivoting the platform with the screw 76 of the lower platform adjustment mechanism until the level indicates that the lower platform is also horizontal. At that point, the tower 12 will be aligned with the vertical Z axis and the lower platform 50 can be locked in place to the chassis using the with the locking mechanisms. While this process can be manually completed with ease, the process can be automated by using digital level sensor and servomotors that drive the adjustment mechanisms.

Figure 6:
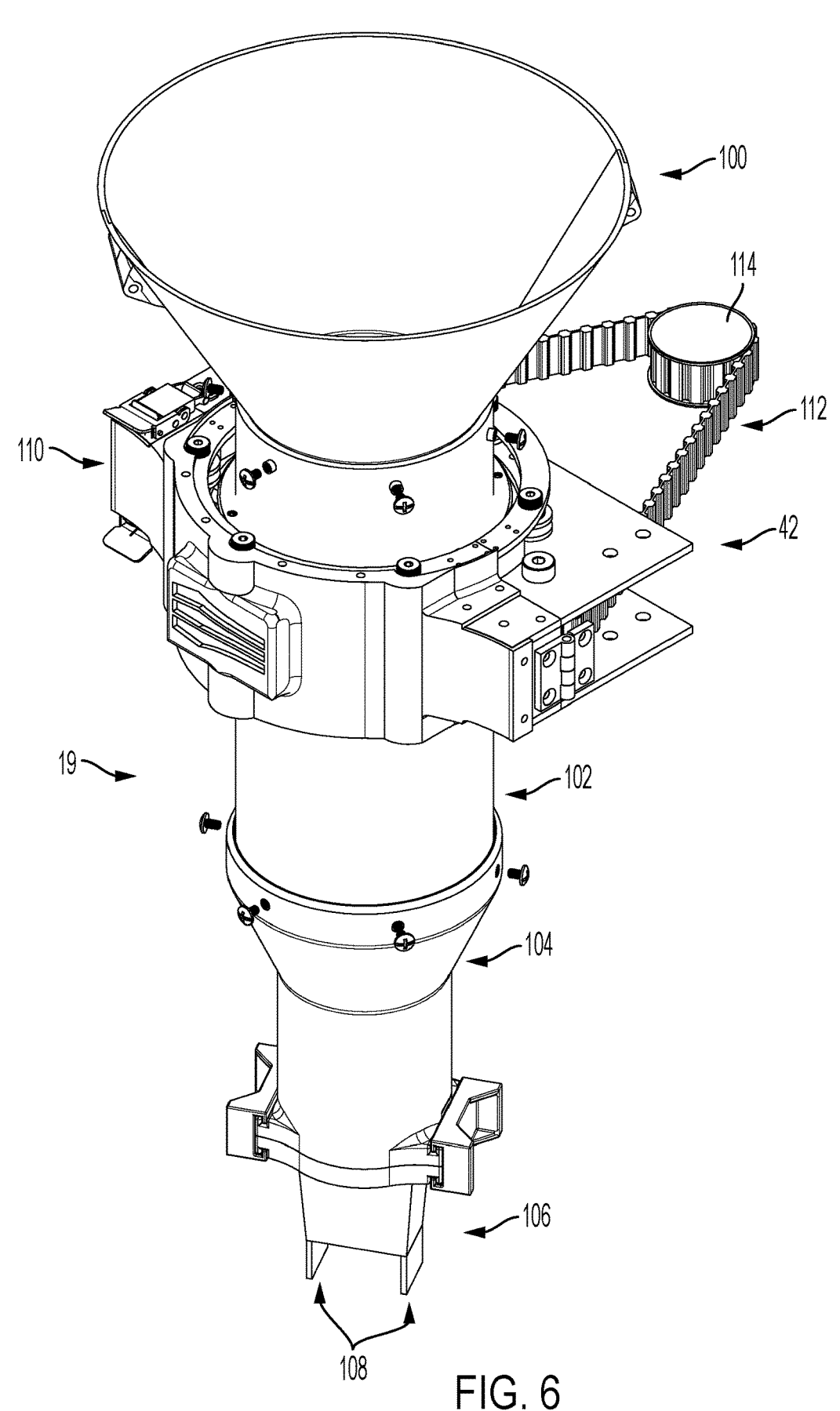
FIG. 6 is a front perspective view of an embodiment of a nozzle assembly of the construction 3D printer of FIG. 1, the assembly shown supported by an embodiment of a nozzle rotation mechanism that incorporates a quick-release feature that enables the assembly to be quickly and easily attached and detached from the remainder of the printer.

Referring next to FIG. 6, illustrated is an embodiment of the nozzle assembly 19 as well as the nozzle rotation mechanism 42. As shown in the figure, the nozzle assembly 19 includes a hopper 100 configured to receive printing material that is to be extruded, a barrel 102 through which the material travels from the hopper to a nozzle 104, and an outlet 106 that extrudes and shapes the printing material received from the nozzle. In situations in which the layers extruded by the nozzle assembly 19 are not desired to be circular in cross-section, the outlet 106 may have particular features that must be oriented in a particular angular position as the printing material is extruded. FIG. 6 shows an example of this as the outlet 106 has lateral trowels 108 that shape the extruded layers to have planar vertical lateral surfaces that, for instance, enable a planar vertical wall can be constructed. In such cases, it is necessary to be able to rotate the nozzle assembly 19. For example, when forming a first planar wall that continues into a second planar wall that is perpendicular to the first wall, it would be necessary to rotate the nozzle assembly 19 through 90 degrees so that the trowels 108 are positioned on the lateral sides of the layers for both walls. A nozzle rotation mechanism, such as that shown in FIG. 6, can be used for that purpose.

In some conventional construction 3D printers, such nozzle rotation mechanisms include timing belts that wrap around the nozzle assembly and that are driven by a drive gear associated with a drive motor. While such rotation mechanisms work, their use can be inconvenient as it is difficult to remove the nozzle assembly, for example, to clean it, when a timing belt is wrapped around the assembly. The nozzle rotation mechanism 42 shown in FIGS. 6 and 7 addresses this problem by rotating the nozzle assembly 19 without wrapping a timing belt around the assembly.

Figure 7:
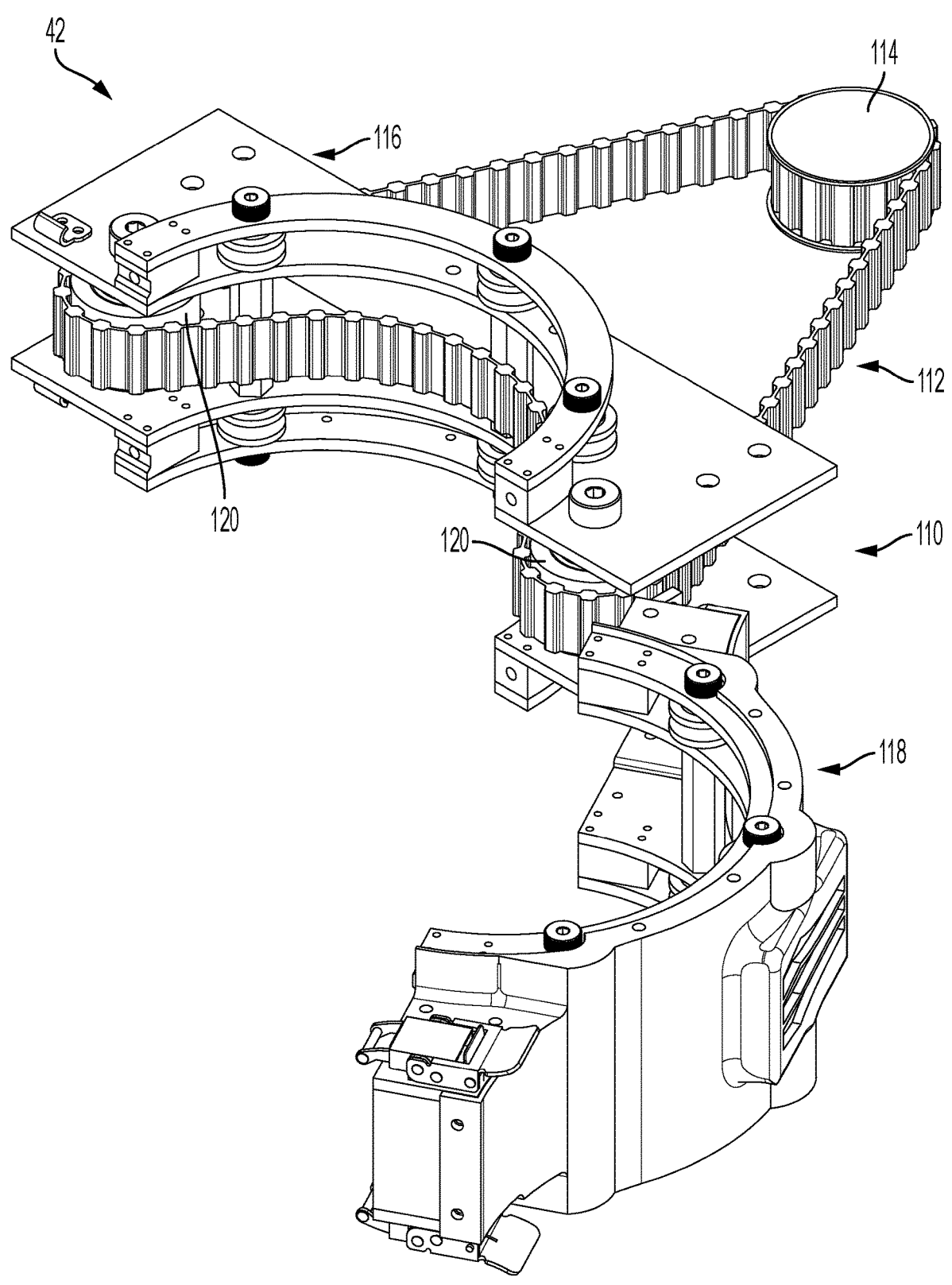
FIG. 7 is a front perspective view of the nozzle rotation mechanism shown in FIG. 6 with the mechanism depicted in an open orientation and illustrating a path of travel of a timing belt of the mechanism within the mechanism.

As shown in FIG. 6, the nozzle rotation mechanism 42 comprises a housing 110 that surrounds the barrel 102 of the nozzle assembly 19. Extending out of the housing 110 is a double-sided timing belt 112 that is driven by a drive gear 114. FIG. 7 shows the nozzle rotation mechanism 42 separate from the nozzle assembly 19 and in an open orientation in which it is prepared to receive the nozzle assembly. As depicted in FIG. 7, the housing 110 is configured as a two-part hinged housing that includes a proximal portion 116 and a distal portion 118 that can pivot toward or away from the proximal portion. Pivotally mounted within the proximal portion 116 at opposite ends within the housing 110 are idler wheels 120 about which the timing belt 112 is wrapped.

As is apparent from FIG. 7, the portion of the timing belt 112 that is positioned within the proximal portion 116 of the housing 110 at any given time during the belt's rotation traces a semicircular path between the idler wheels 120 (at least when the nozzle assembly 19 is received within the housing). The semicircular portion of the timing belt 112 within the closed housing 110 engages gear teeth provided on the nozzle barrel 102 and, therefore, rotates the nozzle assembly 19 without the need for the belt to surround the assembly. Instead, the timing belt 112 only engages the teeth on a proximal side of the barrel 102 (proximal to the drive gear 114) during belt rotation, which is sufficient to rotate the barrel and the remainder of the nozzle assembly 19. As the nozzle assembly 19 can be removed from the housing 110 and disengaged from the timing belt 112 by simply opening the housing by pivoting the distal portion 118 of the housing away from the proximal portion 116 as shown in FIG. 7, the nozzle rotation mechanism 42 can be said to be a quick-release nozzle rotation mechanism or employ a quick-release functionality, which greatly reduces the time and effort needed to remove or install a nozzle assembly.

Figure 8:
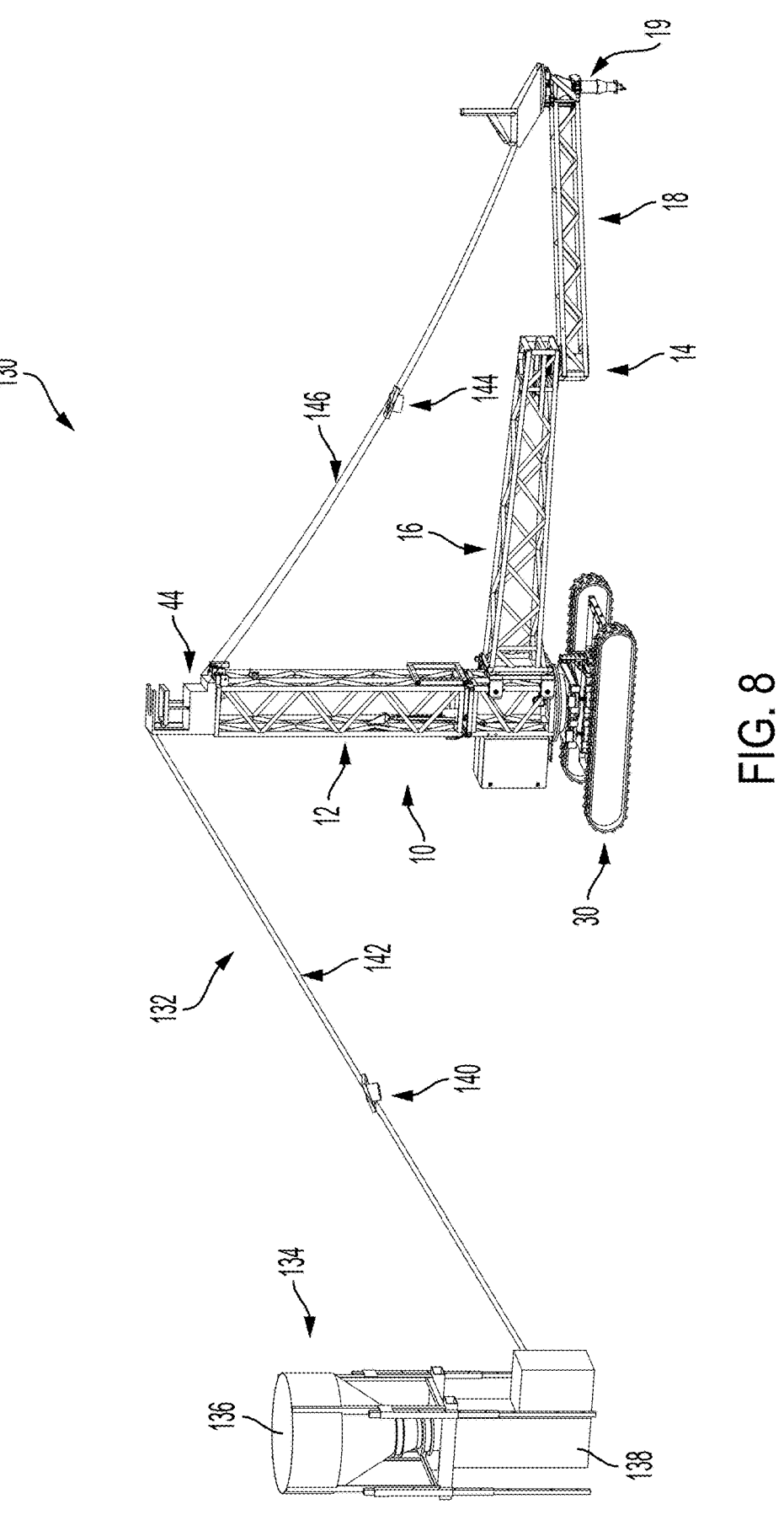
FIG. 8 is a side perspective view of an embodiment of construction 3D printing system that includes the construction 3D printer of FIG. 1 as well as a source of construction printing material and an embodiment of an aerial tram system configured to continually deliver printing material from the source to the nozzle assembly of the printer.

As mentioned above, an aerial tram system can be used to deliver printing material to the nozzle assembly 19 instead of a hose, through which it can be difficult to pass conventional concrete due to its large gravel and high sand content. FIG. 8 illustrates an embodiment of such an aerial tram system 132 as applied to the construction 3D printer 10 of FIG. 1. FIG. 8 can further be said to illustrate an embodiment of a complete construction 3D printing system 130 that includes all the components needed to fabricate large-scale structures using extruded printing material, including the printer 10, the tram system 132, and a source 134 of printing material. In some embodiments, the source 134 of printing material can comprise a silo 136 that contains dry material that is combined with water in a mixer 138 to produce printing material, such as conventional concrete.

As shown in FIG. 8, the aerial tram system 132 includes a first tram 140 that receives printing material from the source 134 and is carried up to the material transfer station 44 provided at the top of the printer tower 12 with a cable system including a continuous cable 142. The printing material within the first tram 140 is then transferred to a second tram 144 at the material transfer station 44, and the second tram is then carried to a position above the hopper 100 of the nozzle assembly 19 (FIG. 6) by a cable system including a continuous cable 146. In the illustrated embodiment, the printing material is transferred from the first tram 140 to the second tram 144 by positioning the second tram immediately below the first tram at the material transfer station 44 and then inverting a bucket of the first tram so that the printing material drops down into a bucket of the second tram. The printing material is then transferred from the second tram 144 to the hopper 100 of the nozzle assembly 19 (FIG. 6) by positioning the second tram immediately above the hopper and then inverting the bucket of the second tram so that the printing material drops down into the hopper. Operating in this manner, printing material can be supplied to the nozzle assembly 19 without interruption, assuming there is enough material located at the printing material source 134.

Figure 9A:
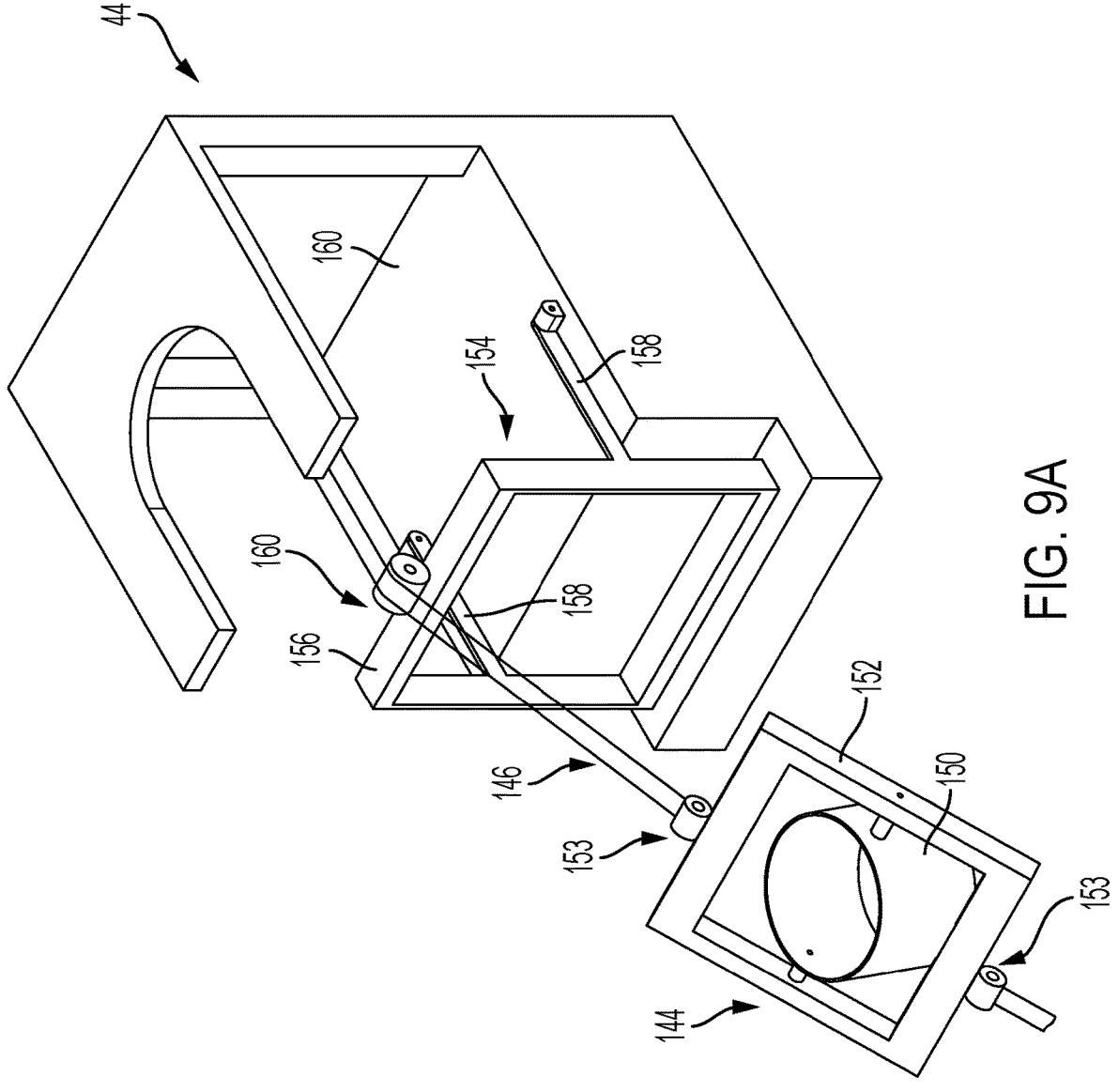
FIG. 9A is a first front perspective view of an embodiment of a material transfer station located at the top of the construction 3D printer tower, the figure showing a second tram of the aerial tram system shown in FIG. 8 at a first sequential position.
Figure 9B:
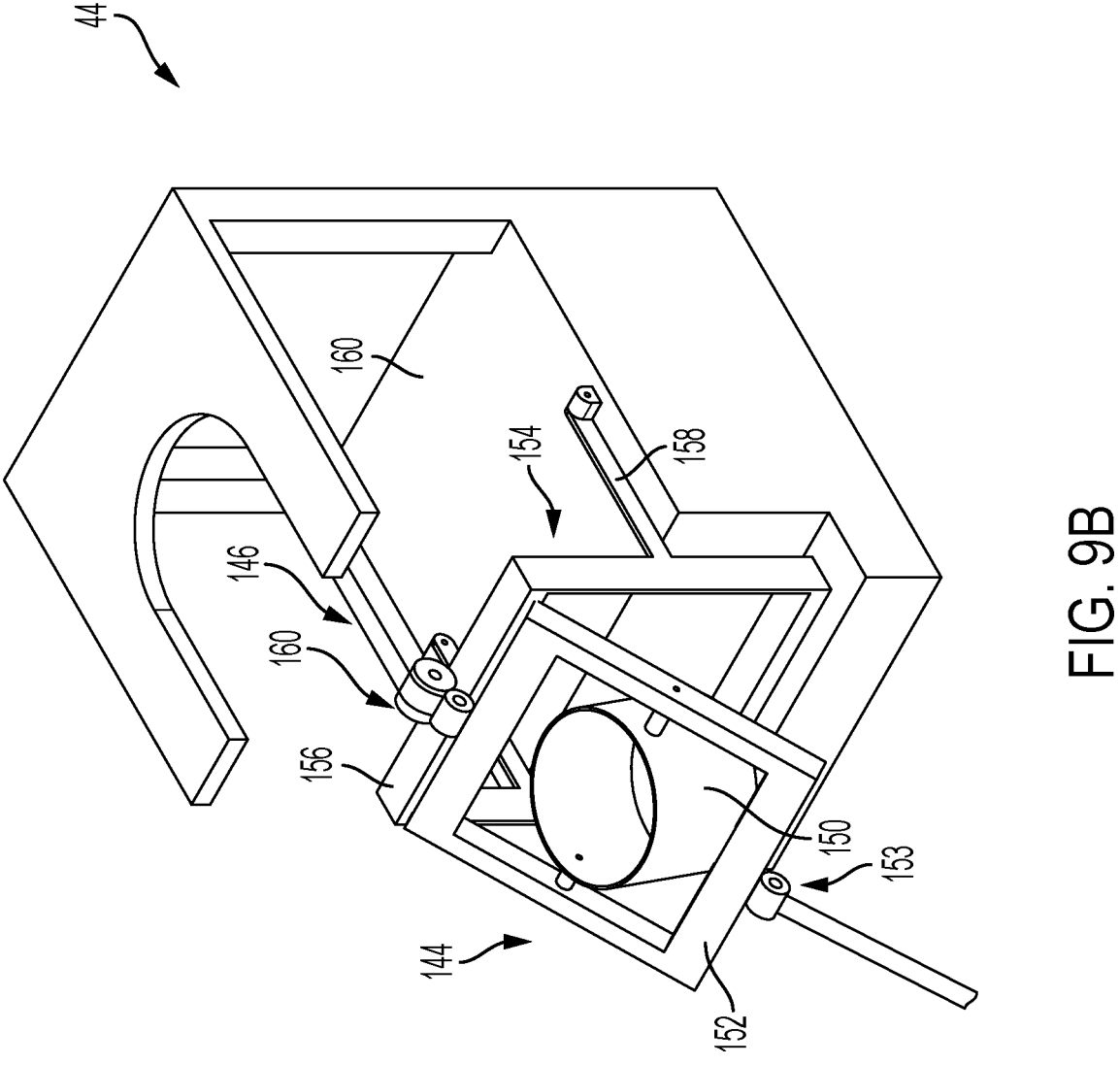
FIG. 9B is a second front perspective view of the material transfer station, the figure showing the second tram at a second sequential position.
Figure 9C:
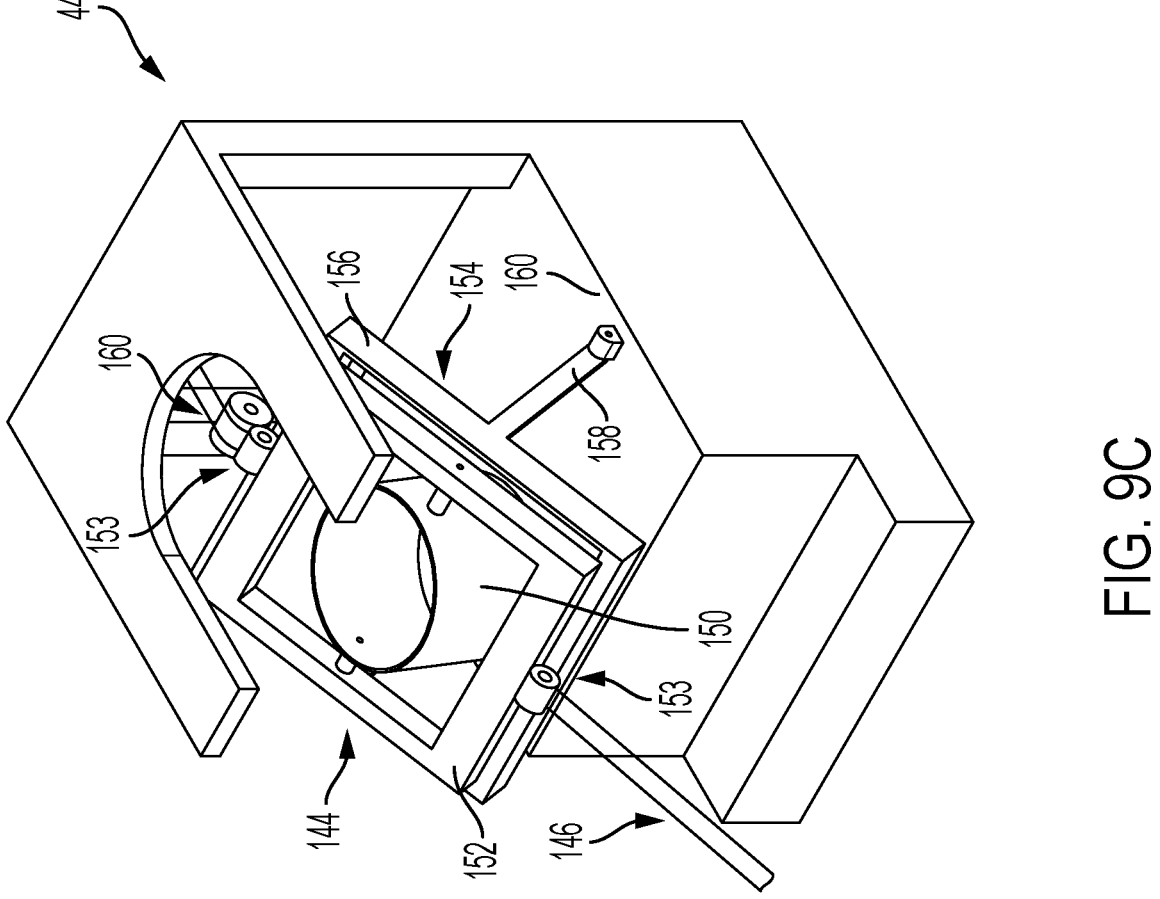
FIG. 9C is a third front perspective view of the material transfer station, the figure showing the second tram at a third sequential position.
Figure 9D:
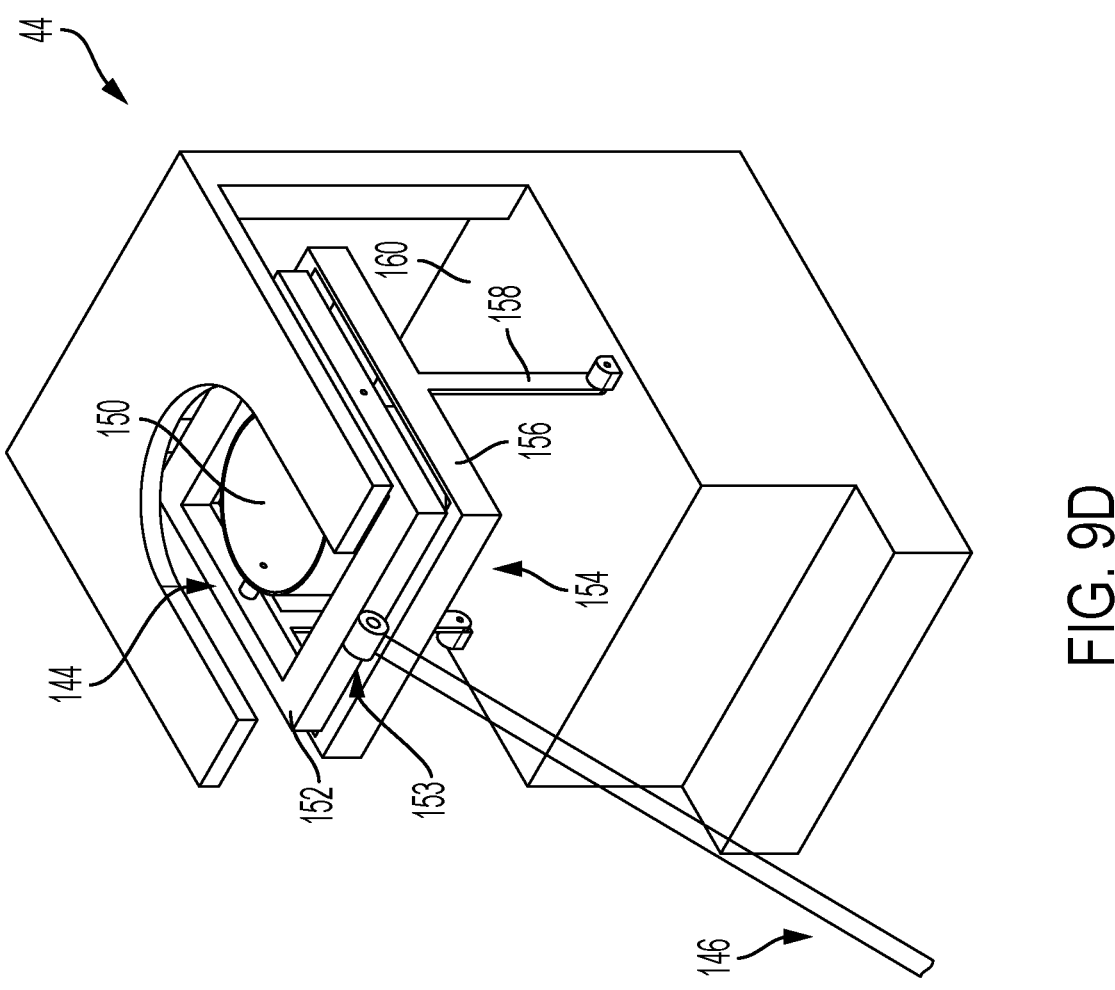
FIG. 9D is a fourth front perspective view of the material transfer station, the figure showing the second tram at a fourth sequential position and prepared to receive printing material from a first tram of the aerial tram system.

FIGS. 9A-9D illustrate the second tram 144 arriving at the material transfer station 44 for the purpose of receiving printing material from the first tram 140, which is not shown for purposes of clarity. As shown in FIG. 9A, the second tram 144 includes a bucket 150 that is pivotally mounted within an open, rectangular, planar tram frame 152. Mounted to the tram frame 152 are pulleys 153 that receive the cable 146, which can carry the second tram 144 to the material transfer station 44. As illustrated in the figure, the material transfer station 44 includes a material transfer station pivot mechanism 154 that, as described below, is configured to place the tram frame 152 in a horizontal orientation within the material transfer station such that its bucket 150 is prepared to receive printing material from the first tram 140, which drops the printing material into the bucket from above. In the illustrated embodiment, the pivot mechanism 154 includes an open, rectangular, planar pivot frame 156 that is in an initial, generally vertical orientation in which the planar frame resides in a generally vertical plane. Extending perpendicularly outward from the pivot frame 156 are two parallel legs 158 that are each pivotally mounted to a platform 160 of the material transfer station 44. With such a configuration, the mechanism 154 can be pivoted upward and backward from its generally vertical orientation shown in FIG. 9A to a generally horizontal orientation, which is shown in FIG. 9D. As is also shown in FIG. 9A, a pulley 160 is mounted to the top of the pivot frame 156 (in the context of the figure) that also receives the cable 146.

Referring next to FIG. 9B, the cable 146 carries the second tram 144 upward to the pivot mechanism 154 to a point at which the tram frame 152 (or a pulley 153 mounted thereon) contacts the pivot frame 156 (or the pulley 160 mounted thereon). With reference to FIG. 9C, as the second tram 144 continues to be pulled closer to the material transfer station 44, the contact between the tram and the pivot frame 156 causes the pivot frame to pivot upward and backward so that is moves from its generally vertical orientation toward a horizontal orientation. As the tram frame continues to be pulled by the cable 146 and the pivot frame 156 continues to pivot, the tram frame comes to rest upon the pivot frame such that the pivot frame lies directly beneath and fully supports the tram frame, as illustrated in FIG. 9C. The movement of the tram frame 152 and the pivoting of the pivot frame 156 continues until the tram 144 is positioned within the material transfer station 44 and both the pivot frame and the tram frame are placed in a final, generally horizontal orientation in which both planar frames reside in a generally horizontal plane, as shown in FIG. 9D. Once the tram 144 and its frame 152 are so positioned and oriented, the tram is prepared to receive printing material from the first tram 140.

Figure 10A:
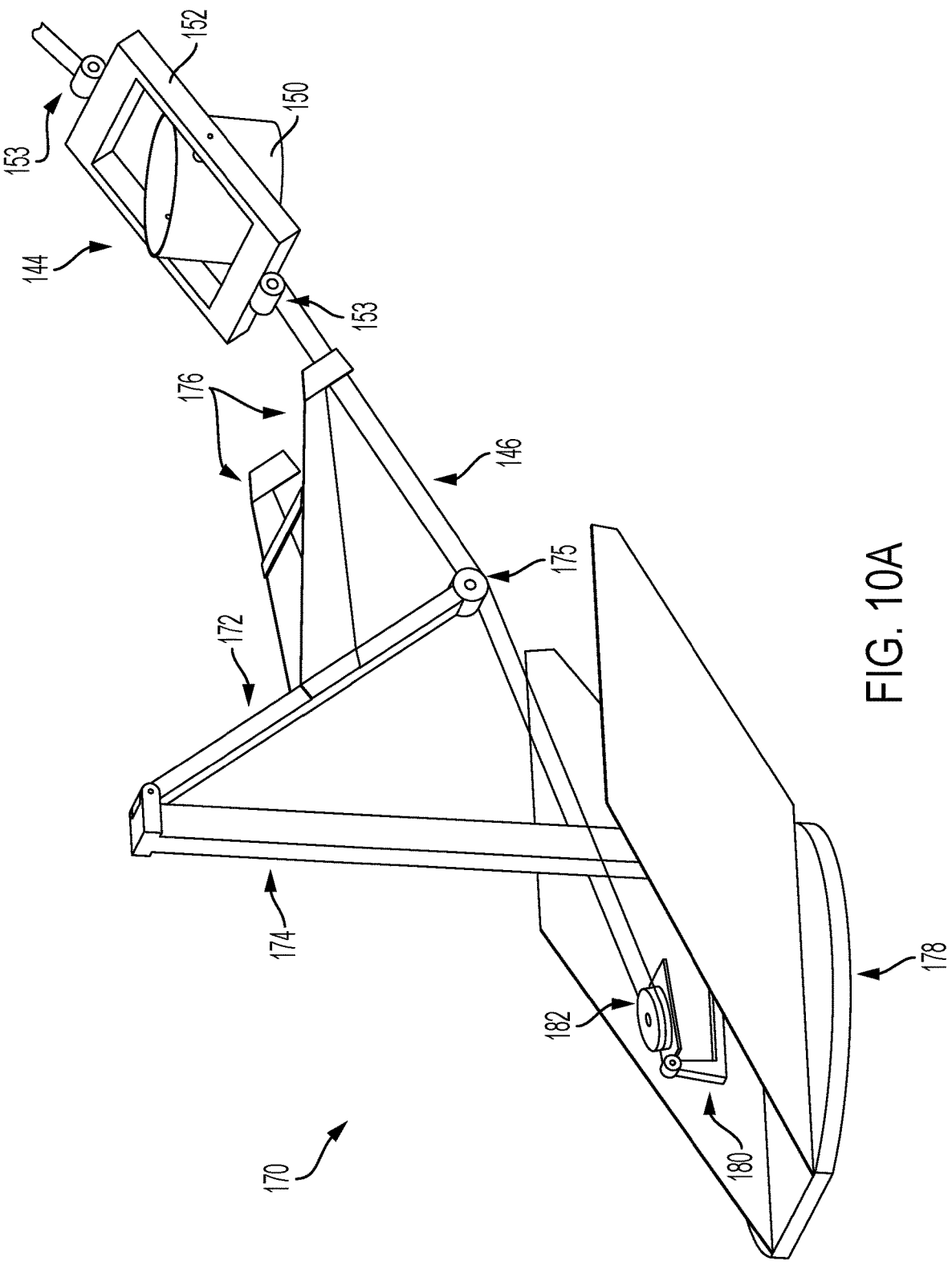
FIG. 10A is a first side perspective view of an embodiment of a nozzle alignment mechanism configured to align the second tram of the aerial tram system with the nozzle assembly of the construction 3D printer for the purpose of supplying printing material to the assembly, the figure showing the second tram at a first sequential position.
Figure 10B:
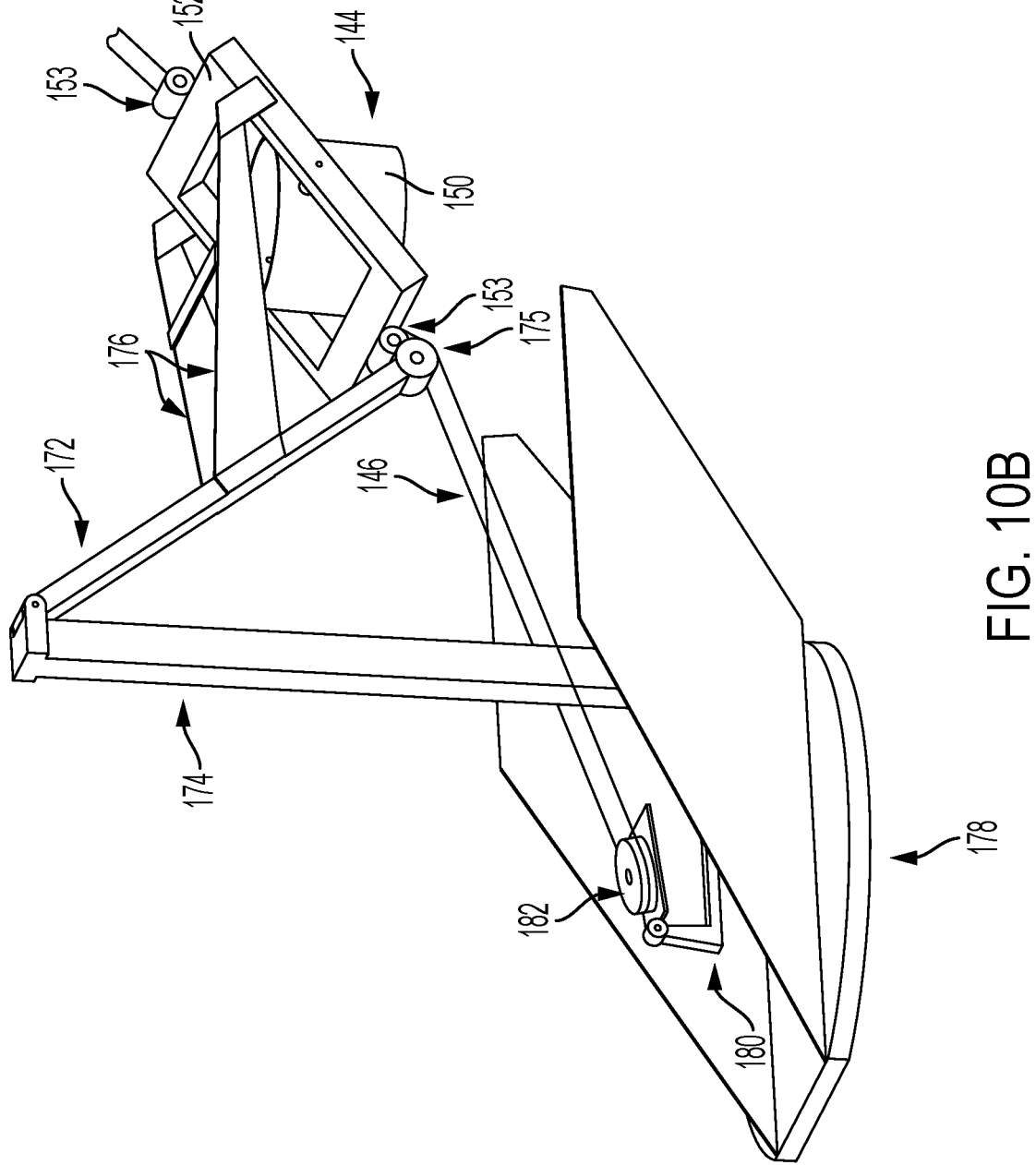
FIG. 10B is a second side perspective view of the nozzle alignment mechanism, the figure showing the second tram at a second sequential position.
Figure 10C:
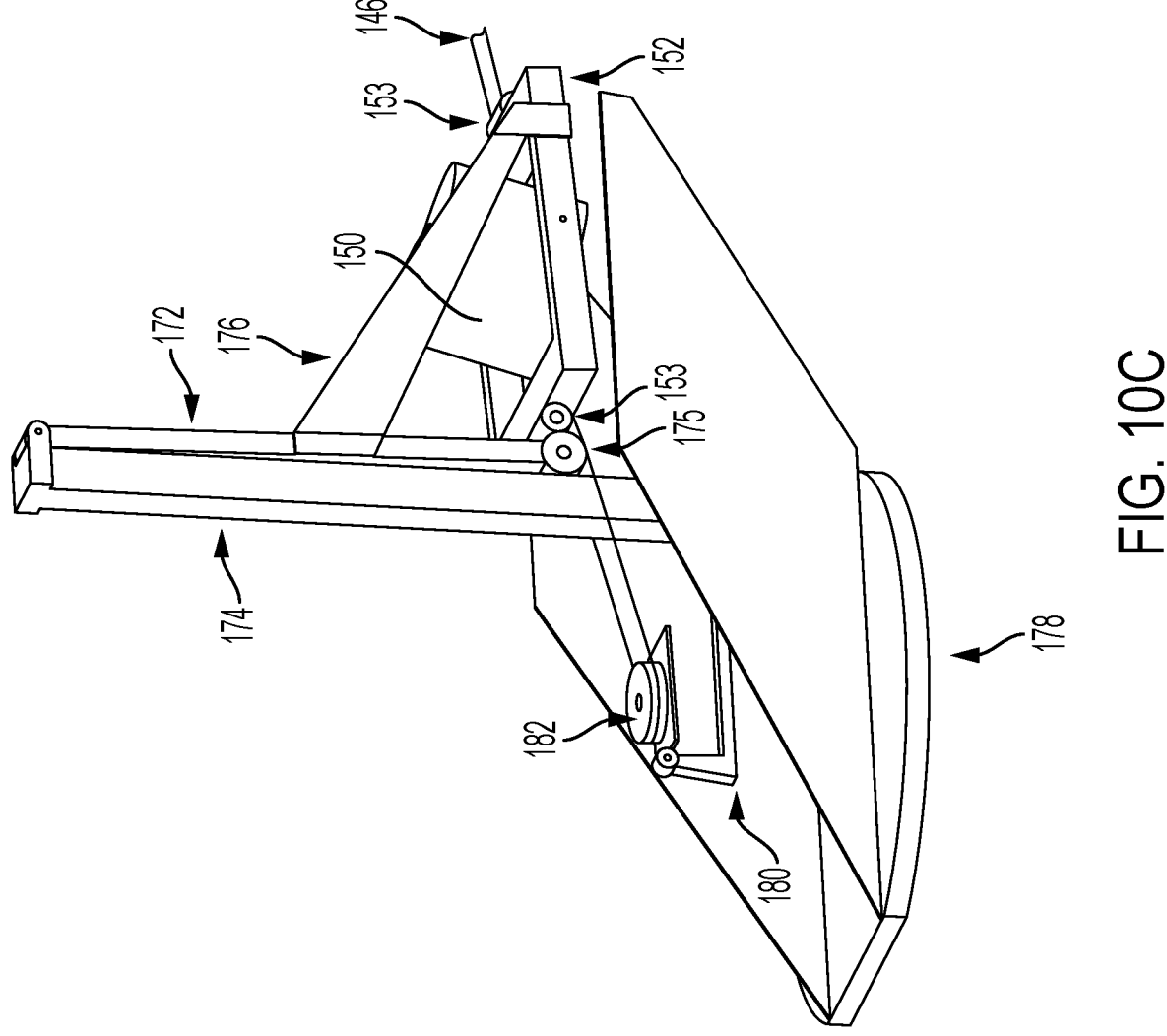
FIG. 10C is a third side perspective view of the nozzle alignment mechanism, the figure showing the second tram at a third sequential position and delivering printing material to the nozzle assembly.

FIGS. 10A-10C illustrate the filled second tram 144 delivering printing material to the nozzle assembly 19 (not shown) above which is positioned a nozzle assembly pivot mechanism 170. Beginning with FIG. 10A, the second tram 144 is carried from the material transfer station 44 on top of the tower 12 toward the nozzle assembly 19 and the pivot mechanism 170. As shown in the figure, the pivot mechanism 170 includes a pivot arm 172 that is pivotally mounted to a vertical post 174. Pivotally mounted to a distal end of the arm 172 is a pulley 175 that receives the cable 146. Fixedly mounted to a medial portion of the arm 172 are a pair of prongs 176 that are configured to engage the sides of the tram frame 152. The post 174 extends upwardly from a base 178 and pivotally mounted to the post or the base is a pulley support arm 180 that supports a pulley 182 about which the cable 146 is wrapped.

With reference to FIG. 10B, as the second tram 144 approaches the nozzle assembly 19 and the pivot mechanism 170, the tram frame 152 (or a pulley 153 thereof) makes contact with the pivot arm 172 (or its pulley 175), which pivots the pivot arm downward and causes the prongs 176 to engage the sides of the tram frame 152 and begin reorienting the frame. Referring next to FIG. 10C, once the second tram 144 has reached a point above the nozzle assembly 19, the tram frame 152 has pivoted the pivot arm 172 until it is substantially vertical and its prongs 176 have transitioned the tram frame 152 to a generally horizontal orientation in which the planar frame lies in a generally horizontal plane. At the same time, an inversion member (not visible) has pivoted the bucket 150 of the second tram 144 to the point at which it has rotated through approximately 180 degrees and has, therefore, inverted so that it drops the printing material it was carrying into the hopper 100 of the nozzle assembly 19.

Figure 11:
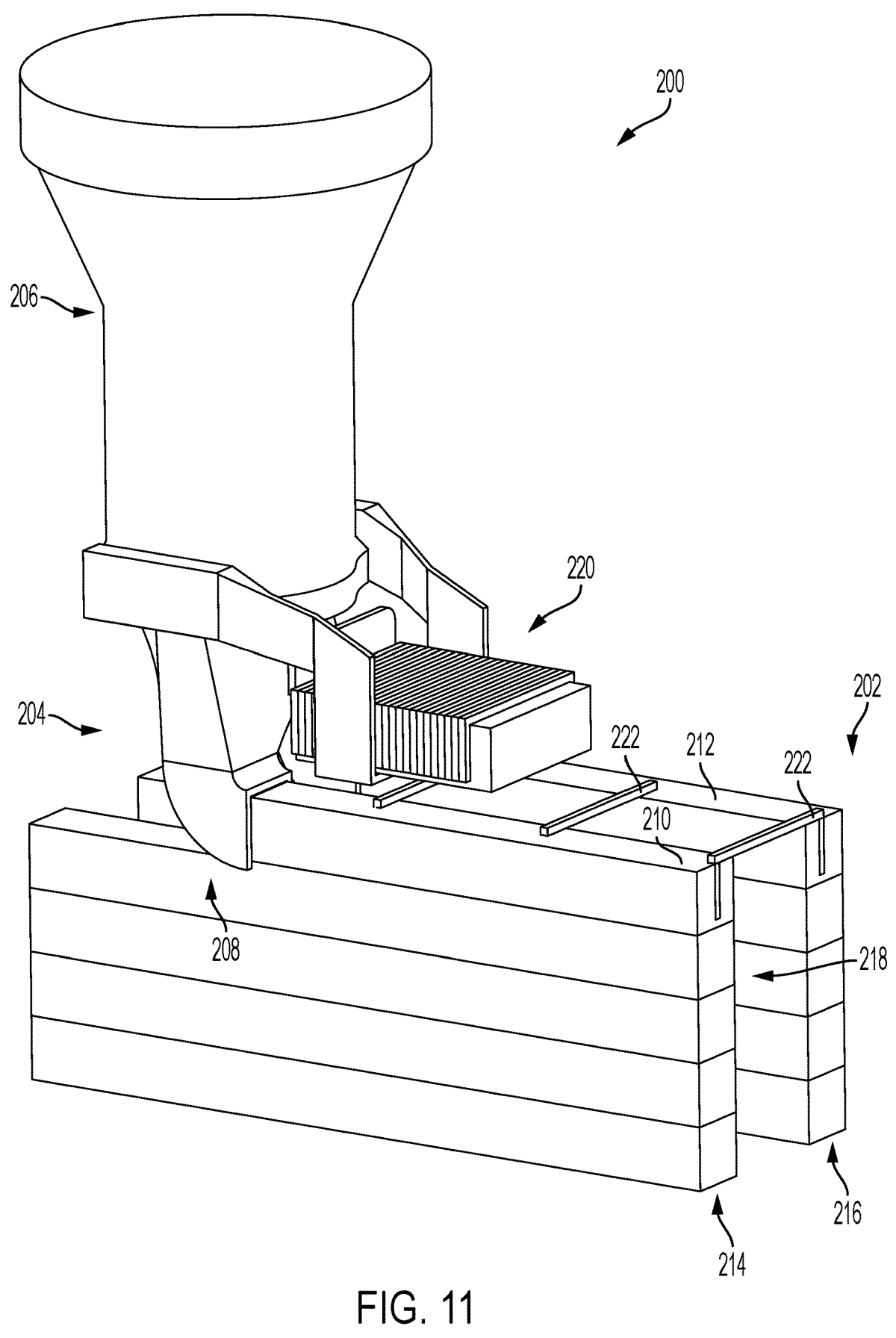

In many cases, the structures that are extruded from a construction 3D printer will be solid-core structures, such as solid-core walls. In some cases, however, it may be desirable to print hollow-core structures. FIG. 11 is a partial view of a nozzle assembly 200 that is configured to extrude hollow-core walls, such as wall 202. As shown in the figure, the outlet 204 attached to the nozzle 206 is a dual-outlet that actually comprises two separate, spaced outlets 208 (only one outlet 208 visible in the figure) from which printing material can be extruded. With this configuration, the outlet 204 can simultaneously extrude two parallel layers of material 210 and 212. As the layers 210, 212 are extruded on top of previously extruded layers 210, 212, respectively, two parallel wall portions 214 and 216 are formed that comprise an empty space 218 between them, which can be filled with another material, such as a stronger or less-expensive material. In order to maintain constant spacing between the wall portions 210, 212 and thereby ensure the space 218 has a constant width, a stapling mechanism 220 can be associated with (e.g., mounted to) the nozzle assembly 200 and used to embed staples 222 into the layers 210, 212 that extend between the layers and, therefore, the wall portions 214, 216 to maintain constant spacing.

It is noted that the disclosed construction 3D printing system can, in some embodiments, incorporate real-time adaptive control features for real-time control of movement speed of the extrusion nozzle, rate of material extrusion, and vertical position of the extrusion nozzle. Sensors, such as laser range finders, responsive actuators, and smart algorithms can be used to enable those control features. Described below are examples of application of such features.

When extruding a first layer of material to fabricate a structure on an imperfect ground or floor surface, the distance between the surface and the nozzle outlet can be measured by a laser range finder associated with (e.g., attached to) the nozzle as it moves above the surface to accurately track the distance between the surface and the nozzle outlet. For depressed areas of the surface, the speed of the nozzle can be reduced so that more material is deposited in that area. In similar manner, the nozzle speed can be increased when depositing areas of the surface that protrude upward. Alternatively, a uniform nozzle speed can be maintained but the material extrusion rate can be changed. In such a case, extrusion can be controlled by a highly responsive servomotor.

When printing on top of a previously printed layer, real-time adaptive motion control can be used to maintain a consistent distance from the previous layer as well as close alignment of the layers' lateral edges (e.g., measured by a sensor such as laser range finder and/or a digital camera) by countering any imposed variation of nozzle vertical or lateral positions. Such variations may be inherent in the structural performance of the machine under different conditions, such as acceleration, sudden turns, etc., or may be subject to the environmental phenomena, such as wind.

Adaptive positioning can involve multiple actuators of the system, including the tower winch, which could maintain an appropriate vertical position of the nozzle by moving the articulable arm incrementally up or down during the course of printing. An alternative, more energy-efficient approach for adaptive motion along the Z axis can be achieved by installing a small servo actuator at the end of the distal arm segment to adaptively move the nozzle to the proper position.

The invention claimed is:

1. A construction three-dimensional printing system comprising:

a construction three-dimensional printer including:

a tower including a lower section and an upper section, the upper section being pivotally mounted on the lower section to enable the upper section to pivot from a vertical orientation to a horizontal orientation and vice versa;

an articulable arm that extends from the tower, the arm including a proximal arm segment that is mounted to the tower at its proximal end and that extends horizontally outward from the tower, and a distal arm segment whose proximal end is pivotally mounted to a distal end of the proximal arm segment, wherein the arm is configured to vertically travel up and down along the tower and wherein the distal arm segment is configured to be rotated relative to the proximal arm segment within a horizontal plane;

a nozzle assembly mounted to a distal end of the distal arm segment of the articulable arm, the nozzle assembly being configured to receive printing material and extrude the printing material to fabricate three-dimensional structures; and a rover upon which the tower is mounted, the rover including a chassis and being configured to move the construction three-dimensional printer around a construction site, wherein the construction three-dimensional printer can be placed in a compact orientation that facilitates transport of the three-dimensional printer by positioning the proximal arm segment of the articulable arm on the lower section of the tower, pivoting the upper section of the tower downward into the horizontal orientation, and rotating the distal arm segment of the articulable arm inward toward the lower section of the tower to place the upper section of the tower, the proximal arm segment, and the distal arm segment into alignment with each other.

2. The system of claim 1, wherein the construction three-dimensional printer further includes a leveling module positioned between the tower and the rover, the leveling module being configured to position and maintain the tower in a vertical orientation without a need for outriggers, the leveling module including a lower platform that is pivotally mounted to the rover chassis and an upper platform that is pivotally mounted to the lower platform.

3. The system of claim 2, wherein the upper platform of the construction three-dimensional printer is configured to pivot about a side of the upper platform that is orthogonal and adjacent to a side of the lower platform about which the lower platform is configured to pivot.

4. The system of claim 3, wherein the upper platform is mounted to the lower platform with hinges provided on one side of the upper platform and includes two spaced adjustment mechanisms provided on an opposite side of the upper platform that are configured to pivot the upper platform about the hinges.

5. The system of claim 4, wherein the lower platform is mounted to the rover chassis with hinges provided on one side of the lower platform and includes a single adjustment mechanism provided on an opposite side of the lower platform, wherein the single adjustment mechanism provides compliance between the leveling module and the rover chassis that enables the chassis to twist to conform to uneven surfaces.

6. The system of claim 1, wherein the construction three-dimensional printer further includes a nozzle rotation mechanism associated with the nozzle assembly that is configured to rotate the assembly.

7. The system of claim 6, wherein the nozzle rotation mechanism includes a motor-driven double-sided timing belt that engages and rotates the nozzle assembly, wherein the timing belt only engages a proximal portion of the nozzle assembly at any given time and does not wrap around the assembly.

8. The system of claim 1, further comprising an aerial tram system configured to deliver printing material to the nozzle assembly of the construction three-dimensional printer, the tram system comprising a tram suspended and transported by a cable system, the tram comprising a tram frame and a bucket pivotally supported by the tram frame, wherein the bucket is configured to receive printing material and to be inverted to drop the printing material down to the nozzle assembly.

9. The system of claim 8, wherein the construction three-dimensional printer further includes a material transfer station located at the top of the tower at which the tram receives printing material to be delivered to the nozzle assembly, wherein the material transfer station comprises a material transfer station pivot mechanism configured to position the tram in a generally horizontal orientation when it is located at the material transfer station.

10. The system of claim 8, wherein the construction three-dimensional printer further comprises a nozzle assembly pivot mechanism configured to position the tram in a generally horizontal orientation when it is positioned above the nozzle assembly.

11. A construction three-dimensional printing system comprising:
a construction three-dimensional printer including:
a tower;
an articulable arm that extends from the tower, the arm including a proximal arm segment that is mounted to the tower at its proximal end and that extends horizontally outward from the tower, and a distal arm segment whose proximal end is pivotally mounted to a distal end of the proximal arm segment, wherein the arm is configured to vertically travel up and down along the tower and wherein the distal arm segment is configured to be rotated relative to the proximal arm segment within a horizontal plane;
a nozzle assembly mounted to a distal end of the distal arm segment of the articulable arm, the nozzle assembly being configured to receive printing material and extrude the printing material to fabricate three-dimensional structures;
a rover upon which the tower is mounted, the rover including a chassis and being configured to move the construction three-dimensional printer around a construction site; and
a leveling module positioned between the tower and the rover configured to position and maintain the tower in a vertical orientation, the leveling module including a lower platform that is pivotally mounted to the rover chassis and an upper platform that is pivotally mounted to the lower platform, wherein the lower platform is configured to pivot about a first axis and the upper platform is configured to pivot about a second axis that is adjacent and orthogonal to the first axis, wherein, because of the operation of the leveling module, the tower can be held in the vertical orientation without the construction three-dimensional printer using outriggers.

12. The system of claim 11, wherein the tower of the construction three-dimensional printer comprises a lower section and an upper section, the upper section being pivotally mounted on the lower section to enable the upper section to pivot from a vertical orientation to a horizontal orientation and vice versa.

13. The system of claim 12, wherein the proximal arm segment, distal arm segment, and the upper section of the tower can be aligned with each other to place the construction three-dimensional printer in a compact orientation that facilitates transport of the construction three-dimensional printer.

14. The system of claim 11, wherein the upper platform pivots about hinges provided on one side of the upper platform and includes two spaced adjustment mechanisms provided on an opposite side of the upper platform.

15. The system of claim 14, wherein the lower platform is mounted to the rover chassis with hinges provided on one side of the lower platform and includes a single adjustment mechanism provided on an opposite side of the lower platform, wherein the single adjustment mechanism provides compliance between the leveling module and the rover chassis that enables the chassis to twist to conform to uneven surfaces.

16. The system of claim 11, wherein the construction three-dimensional printer further includes a nozzle rotation mechanism associated with the nozzle assembly that is configured to rotate the assembly.

17. The system of claim 16, wherein the nozzle rotation mechanism includes a motor-driven double-sided timing belt that engages and rotates the nozzle assembly, wherein the timing belt only engages a proximal portion of the nozzle assembly at any given time and does not wrap around the assembly.

18. The system of claim 11, further comprising an aerial tram system configured to deliver printing material to the nozzle assembly of the construction three-dimensional printer, the tram system comprising a tram suspended and transported by a cable system, the tram comprising a tram frame and a bucket pivotally supported by the tram frame, wherein the bucket is configured to receive printing material and to be inverted to drop the printing material down to the nozzle assembly.

19. The system of claim 18, wherein the construction three-dimensional printer further includes a material transfer station located at the top of the tower at which the tram receives printing material to be delivered to the nozzle assembly, wherein the material transfer station comprises a material transfer station pivot mechanism configured to position the tram in a generally horizontal orientation when it is located at the material transfer station.

20. The system of claim 18, wherein the construction three-dimensional printer further comprises a nozzle assembly pivot mechanism configured to position the tram in a generally horizontal orientation when it is positioned above the nozzle assembly.

\* \* \* \* \*